United States Patent [19]

Kirrmann

[11] Patent Number: 4,727,479

[45] Date of Patent: Feb. 23, 1988

[54] ALLOCATION CIRCUIT FOR PARALLEL BUSSES OF DATA PROCESSING SYSTEMS

[75] Inventor: Hubert Kirrmann, Baden, Switzerland

[73] Assignee: BBC Brown, Boveri & Company, Limited, Baden, Switzerland

[21] Appl. No.: 603,316

[22] Filed: Apr. 24, 1984

[30] Foreign Application Priority Data

May 6, 1983 [CH] Switzerland .................. 2481/83

[51] Int. Cl.⁴ ............................................. G06F 13/16
[52] U.S. Cl. ................................. 364/200; 340/825.51
[58] Field of Search ................................ 364/200, 900; 340/825.51

[56] References Cited

U.S. PATENT DOCUMENTS

| | | |
|---|---|---|
| 4,096,569 | 6/1978 | Barlow . |
| 4,121,285 | 10/1978 | Chen .................................... 364/200 |
| 4,130,864 | 12/1978 | Schlotterer ........................ 364/200 |
| 4,339,808 | 7/1982 | North .................................. 364/900 |
| 4,454,581 | 6/1984 | Nystrom ............................. 364/200 |
| 4,482,948 | 11/1984 | Holden ............................... 364/200 |
| 4,503,495 | 3/1985 | Boudreau ........................... 364/200 |
| 4,541,043 | 9/1985 | Ballegeer et al. . |
| 4,554,628 | 11/1985 | Bell .................................... 364/200 |
| 4,611,297 | 9/1986 | Dudley et al. ...................... 364/900 |

OTHER PUBLICATIONS

IBM Technical Disclosure Bulletin, vol. 22, No. 3, Aug. 1979, (Blum).

Primary Examiner—Gary V. Harkcom
Assistant Examiner—David L. Clark
Attorney, Agent, or Firm—Burns, Doane, Swecker & Mathis

[57] ABSTRACT

An allocation system for the use of a data processing system where plural user systems of the data processing system gain access to parallel busses of the data processing system in a sequential manner based on a priority determination. The priority determination involves an allocation circuit for each user that includes a logic network comprising four bistable flip-flops, an edge triggered D flip-flop and a monostable flip-flop. The flip-flop elements in conjunction with a generated request signal, bus approval signal, bus busy signal, bus claim signal, selection duration signal, compare signal, enable signal and greater or equal signal and appropriate AND, NAND, OR and inverter elements determine the winner or next user when plural user requests are received while the bus is busy. The use of the edge triggered D flip-flop allows a user subsequent immediate access if such user wants the bus again and no other user has requested the bus. The allocation system otherwise gives priority to all other entered requests before a current user if such current user has again requested the bus.

8 Claims, 4 Drawing Figures

ALLOCATION CIRCUIT FOR PARALLEL BUSSES OF DATA PROCESSING SYSTEMS

This invention relates to data processing systems and, more particularly to allocation circuits for parallel busses of data processing systems having several user systems accessed to a bus.

One type of allocation system is described in the British report P No. 869-PLB-18, Results of arbiter test, a preliminary report to the P896 committee, by Paul L. Borill, University College London, Mullard Space Science Laboratory, 31.5.1981. In this report, a bus allocation circuit for an asynchronous bus allocation and having four SR flip-flops and a monostable flip-flop element is specified. This circuit guarantees that user systems which simultaneously wish to access the bus can "contest" the desired bus access, and this also at the same time as a transmission is in progress. This "contest" is arbitrated in accordance with a user system's identification number which decides the identity and priority of the user system. For example, with a 4-bit number 16 user systems can be identified, with a 5-bit number 32 user systems and so forth. The bus then has correspondingly 4 or 5 bus priority lines, respectively, for transmitting the identity or priority, respectively. In the abovementioned report, a user system selection circuit having 8 bus priority lines for the determination of priority is specified. In order to prevent user systems with lower priority from repeatedly being excluded from bus access by a user system with higher priority when their access request has not been complied with, the bus allocation circuit provides for "fairness" in bus allocation by storing the fact that an access request has been complied with and holding back a new access request by this user system until the access requests of all other user systems waiting for bus access have been complied with once. If no further access request has been made by these other user systems, the user systems with the access request initially held back begin the so-called "contest" or priority selection process and the winner obtains bus access in accordance with its priority. The same selection process takes place even when this user system was the last one to use the bus for transmitting its data and no other user system has requested bus access in the meantime. In this last-mentioned case, even a user system which is the only one to occupy the bus must still carry out the selection process even though there is no demand for the bus by any other user systems.

Another type of allocation system is described in the United States Journal Proceedings FJCC (Fall Joint Computer Conference) 1972, AFIPS Press, pages 719-740 by the term "daisy chain". In this system the bus access enable is handed from one user system to the next when a user system has finished its data transmission or does not require the bus for the time being. If the bus is not required and the access enable is passed on, time is lost and the bus remains unoccupied for this period.

SUMMARY OF THE INVENTION

An object of the present invention is to provide an easily and inexpensively implemented bus allocation circuit or an access coordinator, respectively, by means of which the need for carrying out the priority selection process when a bus user system, selected to be active, is the last one to occupy the bus for data transmission and again requests bus access without other user systems having first requested the bus (default mastership) is eliminated.

An advantage of the circuit according to the invention consists in that the bus is more rapidly available, and thus time saving. A special bus line is not required for this. The additional bus line normally required for this information is replaced by a flip-flop element. A user system retains mastership over the bus until the bus is needed by another user system, even if it has concluded its data transmission.

BRIEF DESCRIPTION OF THE DRAWINGS

A preferred embodiment of the invention is illustrated in the accompanying drawings, in which.

DESCRIPTION OF THE PREFERRED EMBODIMENT

Figure 1:
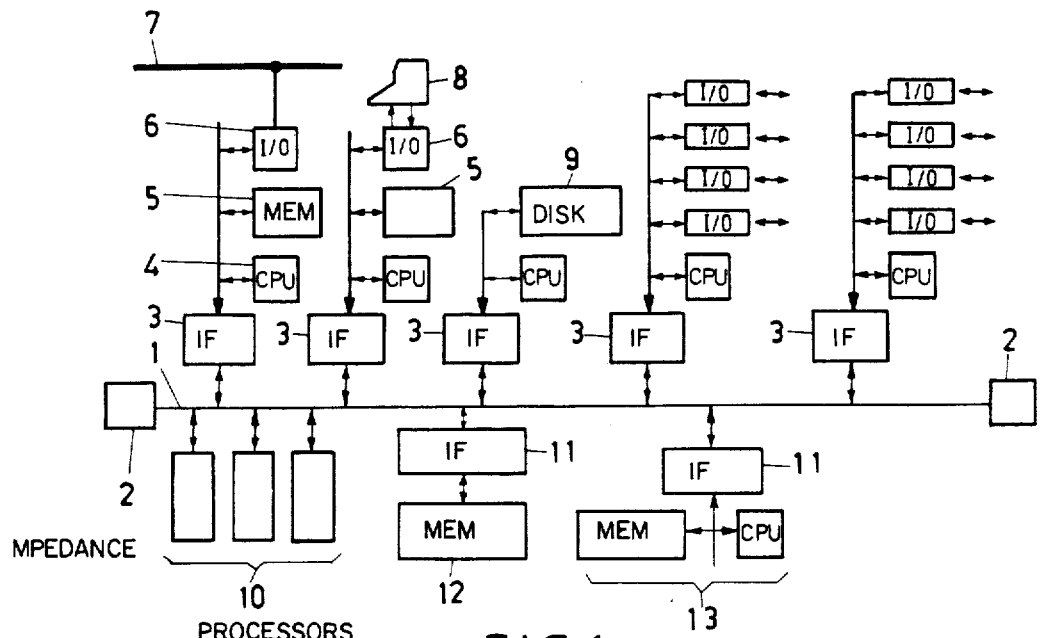
FIG. 1 shows a multi-processor system for which the bus allocation circuit according to the invention can be used.

The bus allocation circuit according to the invention can be used for multi-processor systems in which several processors or user systems, respectively, transmit and/or mutually exchange data. FIG. 1 shows an example for such a multi-processor system. To a bus having several electric lines or a parallel bus, hereinafter briefly called bus 1, which has one or two bus terminating impedances 2, several user systems, which are active with respect to bus allocation and which can temporarily occupy the bus for the transmission of data, are connected via interfaces 3. These bus user systems can have a central processing unit 4, called CPU, and an input/output unit 6, called I/O. In addition, they can have a local memory 5 or a disc control unit 9. The input/output units 6 can be connected to a local network 7 or to a terminal 8.

Below the bus 1, so-called passive user systems are shown which obtain bus access only when they are "addressed", that is to say induced to transmit data by the so-called active user systems shown above the bus. Such passive user systems are, for example, processors 10 for executing scientific and technical calculations and common memories 12 and so-called virtual memories 13, connected via memory interfaces 11.

The components for each user system are mounted on a component board or plug-in card, not shown. This plug-in card can be inserted in the conventional manner into plugs which are conductively connected to the bus. This arrangement guarantees a symmetrical configuration of equal rank and without central control, rapid and fair bus allocation with simultaneous identification of the user system which has occupied the bus and transmits data, and that a plug-in card can be inserted or removed with the system running, that is to say without switching off the data processing system or having to deactivate or reassign user systems during operation.

Figure 2:
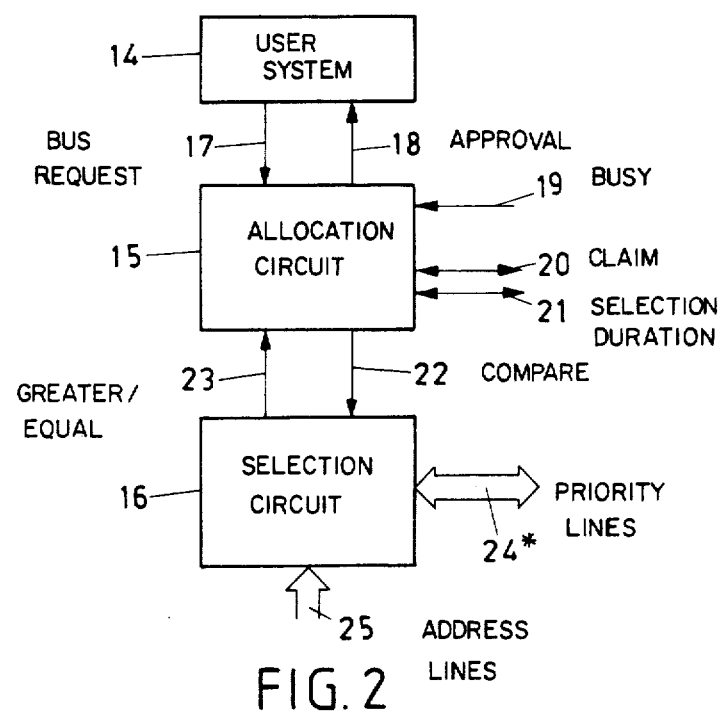
FIG. 2 shows a block diagram of the bus allocation circuit.

Each central processing unit 4 of an active user system is associated via a logic user system circuit 14 with a bus allocation circuit 15 and a user system selection circuit 16, see FIG. 2. A user system announces its claim for occupying the bus by means of a bus request signal 17' via a bus request signal line 17 to the bus allocation circuit 15. In the case of a positive response, the bus allocation circuit supplies it via a bus approval signal line 18 with a bus approval signal 18' in order to tell it that it may use the bus. For control purposes, the bus allocation circuit also receives:

(a) via a bus busy signal line 19 a bus busy signal 19' which indicates whether a data transmission is taking place on the bus. This signal does not necessarily have to be associated with a bus line. It can be derived from bus lines, not drawn, with a synchronisation signal and from an address interval signal which can be detected during an address cycle by a bus line provided for the purpose.

(b) via a bus claim signal line 20 a bus claim signal 20' which indicates whether the bus is requested by at least one user system, (c) via a selection duration signal line 21 a selection duration signal 21' which indicates whether a selection process or a priority contest, respectively, is taking place, (d) via a greater/equal (GE) signal line 23 a GE signal 23' from the user system selection circuit 16 which contains the result of the selection process.

The bus allocation circuit also generates:

(e) a selection duration signal 21' as specified under (c). This is used for implementing the asynchronous selection.

(f) a compare signal 22' which is fed via a compare signal line 22 to the user system selection circuit 16 and contains the information of whether the user system is participating in the selection or not.

The user system selection circuit 16 is connected to bus priority lines 24 onto which all user systems which would like to use the bus for the transmission of data put or transmit their priority or their user system address and on which the address of the winner of the selection, which is the next one to obtain access to the bus, is present or can be detected at the end of the selection process.

The user system selection circuit 16 is also connected to user system address lines 25 from which the address of its own user system can be detected.

Each user system or each plug-in card has its own identity, for example a 5-bit number for 32 user systems which simultaneously defines its priority in the selection process. In this arrangement, for example, the plug-in card with the bit combination 11111 obtains the highest priority and the plug-in card with the bit combination 00000 the lowest, assuming that a "1" is represented by a "low" level on the bus.

In the case of lines which can be simultaneously activated by several user systems, coupling to the lines is advantageously done by means of drivers, for example by transistors with a so-called open collector output, so that no short circuits will occur in the event of a conflict on a line and specified logic levels will be generated.

See the INTEL Corporation, USA, in-house Application Note AP-51, Designing 8086, 8088, 8089 Multi-processing Systems with the 8289 Bus Arbiter, March 1979, with regard to how this bus allocation circuit is associated with the central processing unit 4.

Figure 3:
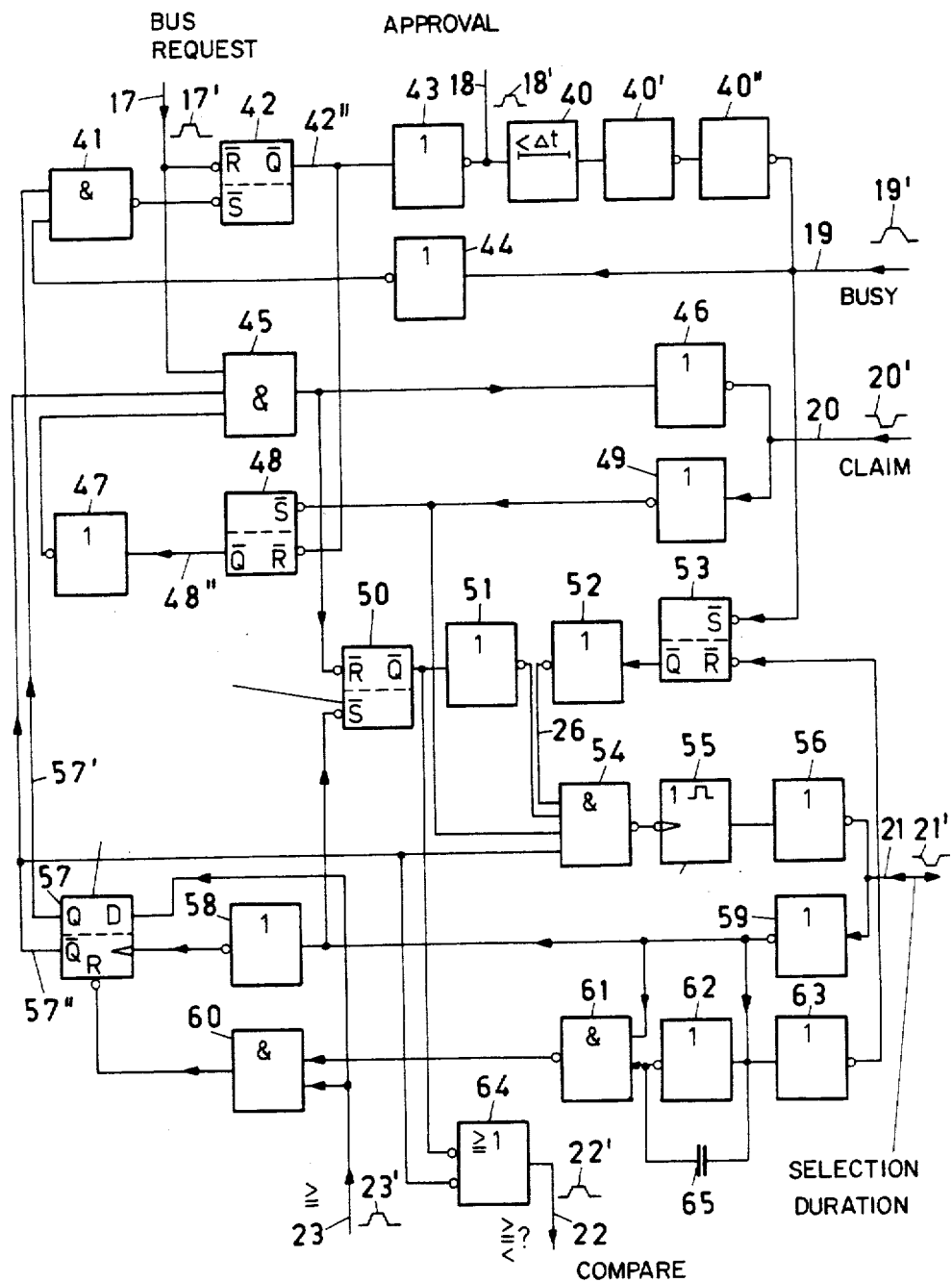
FIG. 3 shows a bus allocation circuit according to FIG. 2.

The bus allocation circuit 15 is built up around six flip-flop elements, see FIG. 3. The input of a bistable flip-flop or RS flip-flop element 42 is connected via its inverted $\overline{R}$ input to the bus request signal line 17 and to one input of an AND element 45 and via its inverted $\overline{S}$ input to the output of a NAND element 41. The $\overline{Q}$ output of the RS flip-flop element 42 is connected, on the one hand, to a NOT element or inverter 43 and, on the other hand, to the inverted $\overline{R}$ input of an RS flip-flop element 48.

The output of the inverter 43 is connected, on the one hand, to the bus approval signal line 18 and, on the other hand, via a series circuit of a delay element 40, an inverter 40' and another inverter 40" to the bus busy signal line 19. This bus busy signal line 19 is also connected via an inverter 44 to one input of an NAND element 41 and to the inverted $\overline{S}$ input of an RS flip-flop element 53.

The bus claim signal line 20 is connected, on the one hand, via an inverter 49 to the inverted $\overline{S}$ input of the RS flip-flop element 48 and, on the other hand, via another inverter 46 to the output of the AND element 45. The $\overline{Q}$ output of the RS flip-flop element 48 is connected via an inverter 47 to one input of the AND element 45.

The inverted $\overline{R}$ input of the RS flip-flop element 53 is connected via a series circuit of an inverter 63 and another inverter 59 to the selection duration signal line 21; the $\overline{Q}$ output is connected via an inverter 52 and a selection enable signal line 26 to one input of a NAND element 54. The output of this NAND element 54 is connected to the inverted dynamic input of a monostable flip-flop element 55 the output of which is connected via an inverter 56 to the selection duration signal line 21.

Another RS flip-flop element 50 is connected via its inverted $\overline{R}$ input to the output of the AND element 45, via its inverted $\overline{S}$ input to the output of the inverter 59 and via its $\overline{Q}$ output via an inverter 51 to another input of the NAND element 54. The $\overline{Q}$ output is also connected to a negated input of an OR element 64 the output of which is connected to the compare signal line 22.

The trigger input of an edge-triggered D flip-flop element 57 is connected via an inverter 58, on the one hand, to the inverted $\overline{S}$ input of the RS flip-flop element 50 and, on the other hand, to the output of the inverter 59. The output of this inverter 59 is also directly connected to one input of a NAND element 61 and, in addition, via a parallel circuit of an inverter 62 and a capacitor 65 to a second input of the NAND element 61. The output of this NAND element is connected to one input of an AND element 60 the second input of which is connected to the GE signal line 23 and also to the D input of the D flip-flop element 57. The output of the AND element 60 is connected to the negated R input of the D flip-flop element 57. The Q output of the D flip-flop element 57 is connected to one input of the NAND element 41, its $\overline{Q}$ output to one input of the AND element 45 and also to one input of the NAND element 54 and to one negated input of the OR element 64.

The RS flip-flop element 42 is set, that is to say its inverted $\overline{S}$ input is set to "0" or "no" and its $\overline{Q}$ output has a "1" signal if the bus is requested, that is to say the bus request signal 17'="1", its own user system has won the selection and simultaneously the bus is free. If its own user system has won the selection, the Q output 57' of the edge-triggered D flip-flop element 57 and the input, connected to it, of the NAND element 41 is at "1". If the bus is free, the bus busy signal 19' present at the input of the inverter 44 is "0" and the other input of the NAND element 41 connected to the output of this inverter is also "1". If both inputs of the NAND element 41="1", its output and the $\overline{S}$ input of the RS flip-flop element 42 is at "0". If then the bus request signal 17' is present at the $\overline{R}$ input of the same flip-flop element 42, the flip-flop element is set.

At the output of the inverter 43, the bus approval signal 18'="1" is present if the $\overline{Q}$ output 42" of the RS flip-flop element 42 shows a "0" signal. If the bus approval signal 18' has a value of "1", this means that the bus is available to its own user system for information transmission. The RS flip-flop element 42 remains set, and thus the bus approval signal 18' remains at "1", until its own user system no longer requires the bus, that is to say until a bus request signal 17' supplied to the inverted $\overline{R}$ input of this flip-flop element assumes a value of "0".

The RS flip-flop element 53 is used in order to prevent a second selection process until the winner of a first selection process has won or occupied, respectively, the bus. If a selection process is taking place, the selection duration signal 21', and thus also the $\overline{R}$ input of the RS flip-flop element 53 is at "0".

If the bus is occupied, the bus busy signal 19'="1" and thus also the $\overline{S}$ input of the RS flip-flop element 53 so that its output $\overline{Q}$ is at "1" and the selection enable signal 26' at "0". This prevents the user system from generating a selection duration signal 21'="0" via the monostable flip-flop element 55. If the selection duration signal 21' changes from "0" to "1", the signal at the $\overline{Q}$ output of the RS flip-flop element 53 initially remains an unchanged "1". This $\overline{Q}$ output signal only becomes a "0" and the selection enable signal 26' becomes a "1" only when the bus busy signal 19' becomes "0", that is to say when the bus is free. Until then, no selection duration signal 21' can be generated by the user system.

The bus busy signal 19' is set after the bus approval signal 18' has become "1" and in any case before a selection process has had time to be completed. The selection process lasts for about 350 ns.

The RS flip-flop element 50 is used for preventing the user system from participating in a selection process which is in progress. The user system is allowed to participate in the selection process when the $\overline{Q}$ output 57" of the RS flip-flop element 50 is set to "0". The prerequisite for this is 1. that it is claiming the bus (bus request signal 17' at "1"), 2. that it has not already won the bus ($\overline{Q}$ of 57 at "1"), 3. that, since the last bus assignment, the requests from all other user systems have been satisfied ($\overline{Q}$ of 48="0", output of 47="1"), and 4. that no selection process is taking place (selection duration signal 21'="1").

So that the result of the selection can be stored in the D flip-flop element 57, it is necessary for the selection enable signal 26' to be "1", making it possible for the selection duration signal 21' to be set to "0" for a predeterminable duration via the monostable flip-flop element 55. A change in the signal at the $\overline{S}$ input of the RS flip-flop element 50 from "0" to "1" leaves the signal at its $\overline{Q}$ output unchanged. In addition, the flip-flop stage 50 blocks the compare signal 22', and thus the compare logic, via the OR element 64.

The RS flip-flop element 48 is used for guaranteeing "fairness" in the bus allocation by determining the duration of the priority selection process by the slowest user system and not by a clock signal (asynchronous selection process). If the user system has used the bus once because of a selection leaving it the winner and again requests the bus, it must wait until all other user systems which have also requested the bus but not had access to it as yet have had bus approval at least once. In this case, it must wait until the bus claim signal 20' is at "1" which means that the bus has not been requested by any other user system or that the latter have already used the bus once. If the bus had already once been available to the user system, the $\overline{Q}$ output 42" of its RS flip-flop element 42 has transferred a "0" signal to the $\overline{R}$ input of the RS element 48 so that the $\overline{Q}$ output 48" of the latter is set to "1" and thus stores the information that the user system has occupied the bus once. A change in the signal at the $\overline{R}$ input of the RS flip-flop element 48 to "1" leaves its output signal unchanged and the preceding information remains stored. Only when the bus is no longer requested and the signal of the bus claim signal line 20="1", a "1" reaches the $\overline{S}$ input of the RS flip-flop element 48, via the inverter 49, and sets its $\overline{Q}$ output to "0" and thus the output of the inverter 47 to "1". This cancels the blocking of the user system. The AND element 45 can now feed a "0" via the inverter 46 to the bus claim signal line 20 which signifies that the bus has been requested. The bus claim signal line 20 thus becomes active and carries a "0" signal when a user system is allowed to participate in the selection process, that is to say if:

1. it is claiming the bus (bus request signal 17'="1"), 2. it has not already won the bus ($\overline{Q}$ output 57" of the D flip-flop element 57="1"), and 3. all requests by other user systems have been dealt with since the last time the bus was assigned to this user system (bus claim signal 20'="1" and $\overline{Q}$ output 48" of the RS flip-flop element 48="0").

If these conditions have been met, the $\overline{R}$ input of the RS flip-flop element 50 receives a "1". If the $\overline{S}$ input of the same flip-flop element is at "0" (no selection duration signal 21'), the flip-flop element 50 flips and at the $\overline{Q}$ output a "0" appears which supplies a compare signal 22'="1" via the OR element 64 so that the user system participates in the selection in the user system selection circuit 16, see FIG. 2.

The monostable flip-flop element 55 with the inverted dynamic input is used for generating the selection duration signal 21'. This selection duration signal is needed for preventing a user system from participating in a selection process which has already started (RS flip-flop element 53) and for establishing the longest-possible duration of a selection process. For the selection duration signal 21', a separate bus line is provided which must be activated, that is to say set to "0", by every user system involved in the selection process, as soon as the selection process can take place and for as long as a user system needs in order to arbitrate the selection.

The flip-flop element 55 is triggered when all conditions for a selection process have been met, namely (1) if the user system has not already won the bus (output 57"), (2) if the bus is being requested by this or another user system (output of 49), (3) if the flip-flop element 50 is set, that is to say if the fairness condition (flip-flop element 48) has been met and no selection process is taking place (output 59), (4) if the winner of the last selection process has obtained the bus and activated the bus busy signal line 19 (flip-flop element 53).

Its output pulse is of such a duration that the separate user system selection circuit 16 has sufficient time for arbitrating the selection. The presence of the selection duration signal 21'="0" signals to all other user systems that a selection process is taking place.

Other waiting user systems can participate in the selection at the same time since release for selection occurs for all at the same time, that is to say when the bus is free and the bus busy signal 19' becomes "0". So that even the slowest user system can clearly recognise the beginning of the selection process, the following timing condition must be met: between deactivation (19→"0") of the bus busy signal 19' and activation (21→"0") of the selection duration signal line 21, a certain predeterminable time must elapse which is dependent on technology. This time is, for example, 50 ns; it should be at least as long as the duration of two gate delays plus three times the bus transit time.

The end of the selection process is signalled by the rear edge of the selection duration signal 21' which comes from the slowest user system involved in the selection because the selection duration signal line 21 is loaded or activated by open-collector output drivers.

The edge-triggered D flip-flop element 57 with the inverted reset input is used for generating and storing a winner signal when its own user system has won the selection process. In this case, the user system selection circuit 16 supplies a greater/equal signal 23' of "1". This signal is stored as winner signal by the back edge of the selection duration signal 21', that is to say when the selection duration signal 21' changes from "0" to "1" which is transferred via the inverters 59 and 58 to the trigger input of the D flip-flop element 57. At the Q output of the D flip-flop element the signal "1" with the meaning of "winner" then appears and at the $\bar{Q}$ output of the D flip-flop element simultaneously the signal "0" appears. Storage of a winner signal as a result of noise pulses at the D and trigger input of the D flip-flop element 57 must be prevented. If noise is present, the reset input R of the D flip-flop element 57 remains activated and the winner is not stored. However, an unimpaired winner signal remains stored until a selection process begins and the D flip-flop element 57 is reset via its inverted reset input. For this the circuit consisting of NAND element 61, inverter 62 and capacitor 65 is responsible. This circuit forms a differentiating element which, via the AND element 60 resets the flip-flop element 57 on the front edge of the selection duration signal 21'. The user system left as winner of the selection can subsequently claim the bus as soon as or if it is free, that is to say if the bus busy signal 19'="0". The output signal of the NAND element 41 is then "0" so that the output signal of the RS flip-flop element 42 also becomes "0" and the bus approval signal 18' becomes "1".

With the D flip-flop element 57, a saving in the selection process is effected if its own user system has won the bus, wants the bus again and no other user system has requested the bus, that is to say if the signal on the bus claim signal line 20="1". If a new bus request comes with a bus request signal 17'="1" from the logic user system 14, the output signal of the NAND element 41 is still unchanged at "0" and the user system has immediate access to the bus without having to carry out a selection process. As long as the Winner signal is stored, a "0" signal is passed from the $\bar{Q}$ output of the D flip-flop element 57 to the AND element 45 which makes its output signal "0" which means that its own user system does not activate the bus claim signal line 20. In addition as a result of this non-activating, user system selection circuits 16 of different configurations are made to be compatible with the bus allocation circuit 15 according to the invention. However, if in the meantime a selection process has taken place or is taking place, the flip-flop element 57 has been reset and the user system must participate in a selection process.

The present bus allocation circuit 15 also makes it possible to identify the user of the bus since the priority information, that is to say the information on which user system is occupying the bus, is present on the bus priority lines 24 until this user system loses its winner signal. This is achieved by the fact that the $\bar{Q}$ output of the D flip-flop element 57 is connected to the inverted input of the OR element 64. If a winner signal has been stored, the $\bar{Q}$ output of the D flip-flop element 57 is at "0", the output of the OR element 64 is at "1" and thus the address of the winner can be detected at any time by the bus priority lines 24. This makes it possible to implement monitoring functions and also so-called dynamic priorities with which different algorithms can be used for the bus allocation. For example, it is possible to change the bus priority on the basis of the detectable priority in order to organise ordered waiting queues. At the same time, this invention offers the additional advantage that a faulty start is prevented if the winner D flip-flop element of two user systems is set for whatever reason, for example by interference on the bus. A correction would take place immediately via the GE signal 23' which must be true or "1" so that the RS flip-flop element 42 can be set.

Correction by the GE signal 23' brings the further advantage to the bus allocation circuit 15 according to the invention that it is self-starting and does not require any initialisation pulse in order to go to its initial state.

Figure 4:
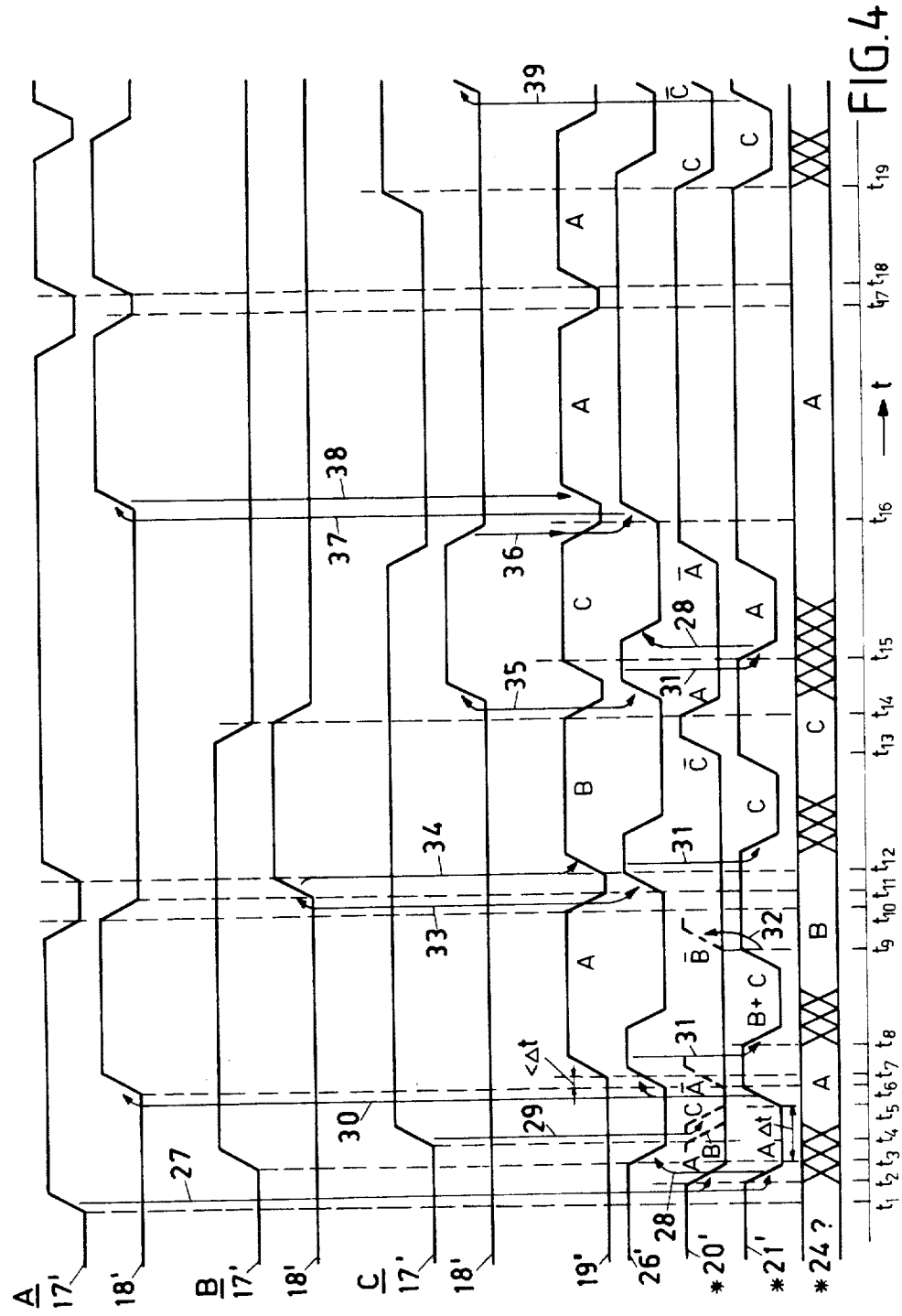
FIG. 4 shows a signal diagram for explaining the action of the bus allocation circuit of FIG. 3.

In the text which follows, the action of the bus allocation circuit according to the invention is explained again with the aid of the signal diagram of FIG. 4 in which the states of different signals are plotted along the ordinate and time t along the abscissa. A, B and C designate three user systems whose bus request and bus approval signals 17' and 18' have in each case been entered one under the other. Underneath that, the characteristics of the bus busy signal 19', the selection enable signal 26', the bus claim signal 20' and the selection duration signal 21' and the signals on the bus priority lines 24 from the user systems A, B and C are shown. In the case of the signals 20' and 21' generated by open-collector output drivers and marked by an *, the on states are shown low and the off states high; for the other signals the on states are shown high and the off states low. Arrows 27 to 39 indicate which signal changes or states are caused by or follow each other.

The signal characteristics before time $t_1$ characterise, for example, the on state at which no user system is requesting the bus. In this condition, the bus busy signal 19' is at "0" and the selection duration signal 21' at "1" so that the RS flip-flop element 53 has a "0" signal at the $\bar{Q}$ output and the selection enable signal 26' is "1". Thus a new selection process can begin at any time. At time $t_1$, user system A requests the bus; its bus request signal 17' changes from "0" to "1". This has the result that the output signal of the AND element 45 becomes "1" and the bus claim signal 20' at the output of the inverter 46 goes to "0" at time $t_2$. At the same time, the output signal of the RS flip-flop element 50 becomes "0" and via the OR element 64 with negated inputs, the output or compare signal 22' of which assumes the value "1", permits a selection process to begin immediately. Since the output signal of the inverter 51 assumes a value of "1", the output signal of the NAND element 54 becomes "0" and triggers the monostable flip-flop element 55 which, via the inverter 56, activates, that is to say sets to "0", the selection duration signal 21', see arrow 27 in FIG. 4. The fact that the selection duration signal is at "0" results in the RS flip-flop element 53 being reset via the inverters 59 and 63 and the selection enable signal 26' being changed from "1" to "0", see arrow 28. The beginning of the selection duration signal 21' simultaneously resets the D flip-flop element 57 of all user systems via the differentiating element 61, 62, 65. The last bus user thus loses its right to use the bus again without a selection process.

At time $t_3$, the bus is requested by user system B whilst a selection process is running. Before this, the $\overline{R}$ input of its RS flip-flop element 50 was at "0" and as a result of the "0" of the selection duration signal detected by the selection duration signal line 21 its $\overline{S}$ input was at "1" and a $\overline{Q}$ output signal therefore at "1" which, at the output of its OR element 64 with negated inputs, causes a "0" compare signal 22' and thus prevents participation in the selection process. If now its bus request signal 17' changes to "1", the $\overline{R}$ input of its RS flip-flop element 50 also receives, via the AND element 45, a "1" signal which, however, leaves the output signal of this RS flip-flop element unchanged. However, user system B also activates the bus claim signal line 20, via its inverter 46, which is indicated by a dashed line in the signal characteristic of 20' in FIG. 4.

At time $t_4$, user system C also wishes to use the bus. With respect to this wish, it is in the same position as user system B. It also activates the bus claim signal line 20, see arrow 29. At time $t_5$, the output signal of the monostable flip-flop element 55 of the user system A flips back to its initial value and the selection duration signal 21' changes from "0" to "1". As a result of this change or edge of the selection duration signal 21', the winner of the selection process (in this case with only one involved party) is stored in the edge-triggered D flip-flop element 57. Since the bus is free, the bus busy signal 19' is "0" and the NAND element 41 is enabled via the inverter 44, the user system A can immediately use the bus. Via its RS flip-flop element 42, user system A sets his bus approval signal 18' to "1" at time $t_6$, see arrow 30, and keeps this state stored for as long as its bus request signal 17' is "1".

Since at the end of the selection process the selection duration signal changes from "0" to "1" and the bus busy signal 19' is "0", a "0" signal occurs at the output of the RS flip-flop element 53 so that the selection enable signal 26' is "1" and the user systems B and C can begin with a new selection process, see arrow 31, time $t_8$. User system A, however, must occupy the bus, time $t_7$, and set the bus busy signal 19' to "1" before the user systems B and C have completed the selection process. $t_7-t_6$ must be $<\Delta t$ where $\Delta t$ is the duration of time for the fastest selection process.

If user system B is faster than C, its monostable flip-flop element 55 will reset its output signal faster than the flip-flop element 55 of user system C. However, the selection duration signal 21' remains at "0" until it is deactivated or set to "1", respectively, also by C at time $t_9$. As a function of this transition, the selection enable signal 26' is set to "0" and prevents C from setting the selection duration signal 21' to "0" again.

At time $t_9$ B has stored the information that it is the winner of the selection process. At the output of its inverter 46 it generates a bus claim signal 20' = "1", see arrow 32. However, the bus claim signal line 20 is still being held at "0" by C since C is not the winner.

At time $t_{10}$, A has completed its information transfer and sets the bus busy signal 19' to "0". As a function of this, the selection enable signal 26' goes to "1" and the bus approval signal 18' of B to "1" at time $t_{11}$, see arrow 33. The selection enable signal 26' being at "1" allows user system C to begin with a new selection process.

Since the bus is available for B, it sets the bus busy signal 19' to "1" at time $t_{12}$.

At this time $t_{12}$, A again requests the bus. Since user system A has already had prior use of the bus and the bus claim signal 20' has in the meantime not returned to its inactive state "1", it cannot participate in the selection process with C.

At time $t_{13}$, C has won the selection process and no longer activates the bus request signal line 20. The bus claim signal 20' becomes "0" and sets the RS flip-flop element 48 of the user system A. As a result of this, the RS flip-flop element 50 is reset via the AND element 45 so that a "0" signal occurs at the flip-flop $\overline{Q}$ output and via the OR element 64 with negated inputs or via the compare signal 22', respectively, enables a selection process for A. Simultaneously, A sets the bus claim signal 20' to "0".

At time $t_{14}$, B has also finished its information transfer and sets the bus busy signal 19' to "0". This sets the selection enable signal 26' for all user systems and especially for A and the bus approval signal 18' for C to "1", see arrow 35.

At time $t_{15}$, C has set the bus busy signal 19' to "1" and A sets the selection duration signal 21' to "0".

At time $t_{16}$, C has finished its information transfer; it sets the bus busy signal 19' to "0" and thus the selection enable signal 26' to "1", see arrow 36, whereupon A takes over the bus, see arrow 37, and sets the bus busy signal 19' to "1" again, see arrow 38. The address of A remains on the bus priority lines 24 (the winner remains stored in the D flip-flop element 57) until another user system requests the bus. During the selection process, its address can be over-written by other user systems which is marked by XX.

At time $t_{17}$, A has finished its information transfer without the bus having been requested by other parties.

At time $t_{18}$, A again requests the bus and immediately takes it over without selection process since the bus had not been requested by any other user system in the meantime. This saves the time for one selection process.

At time $t_{19}$, C again requests the bus and begins a selection process. This resets the flip-flop element 57 of A and A loses the right of using the bus without selection process. After A has finished the information transfer, see arrow 39, C acquires the bus.

Naturally, the invention is not restricted to what is shown in the drawings. Thus, instead of a negative signal logic for the bus claim signal 20' and the selection duration signal 21', positive logic could also be used. Also, all signal lines could be operated with a different signal logic. Instead of flip-flop elements of NAND elements, such of NOR elements could also be used in which case the truth tables for RS flip-flops of NOR elements would have to be taken into consideration with regard to inputs and outputs.

What is claimed is:

1. A data processing system having plural user systems connected to a common bus, said data processing system also having a first signal line for indicating whether the bus is busy, a second signal line for indicating whether any one of said user systems is capturing the bus, means for generating a signal indicating which user system has been awarded priority to capture the bus, and an allocation circuit for each respective user system, each of said allocation circuits comprising:
- a first bistable storage element responsive to said generating means for producing a winner signal which indicates that the user system associated with the allocation circuit has been awarded priority to capture the bus, said first bistable storage element also being responsive to signals on said second signal line to terminate said winner signal when at least one of said user systems initiates a process to capture the bus;
- a second bistable element responsive to said winner signal and to signals on said first signal line for generating a bus approval signal indicating whether the bus is available to the associated user system requesting access to the bus; and
- the indication that a user system is in the process of capturing the bus appearing as a pulse on said second signal line, said first bistable storage element comprising an edge-triggered D-type flip-flop, said flip-flop having a trigger input terminal which is connected to said second signal line so that said flip-flop is triggered in response to th trailing edge of pulses on said second signal line, a reset input terminal which is connected to said second signal line so that said flip-flop is reset in response to the leading edge of pulses on said second signal line, a data input terminal connected to said generating means, and an output terminal for producing said winner signal.

2. The data processing system of claim 1 wherein said allocation circuit includes an OR gate having an input terminal connected to said first bistable element for receiving a signal resulting from said winner signal, said OR gate producing an output signal which indicates that the associated user system is selecting the bus.

3. A data processing system having plural user systems connected to a common bus, said data processing system also having a first signal line for indicating whether the bus is busy, a second signal line for indicating whether any one of said user systems is capturing the bus, means for generating a signal indicating which user system has been awarded priority to capture the bus, and an allocation circuit for each respective user system, each of said allocation circuits comprising:
- a first bistable storage element responsive to said generating means for producing a winner signal which indicates that the user system associated with that allocation circuit has been awarded priority to capture the bus, said first bistable storage element also being responsive to signals on said second signal line to terminate said winner signal when at least one of said user systems initiates a process to capture the bus;
- a second bistable element responsive to said winner signal and to signals on said first signal line for generating a bus approval signal indicating whether the bus is available to the associated user system requesting access to the bus;
- said allocation circuit including a NAND gate having one input terminal connected to said output terminal of said first bistable element to receive said winner signal and a second input terminal connected to said first signal line, said second bistable element comprising an RS flip-flop having an inverted reset input terminal connected to said user system to receive requests for access to the bus, an inverted set input terminal to receive an output signal from said NAND gate, and an output terminal; and
- said allocation circuit further including a third bistable storage element having input terminals respectively connected to said first and second signal lines, said third bistable element being responsive to a signal on said second signal line to produce an inhibit signal which inhibits the allocation circuit form placing a signal on said second line, and being responsive to a signal on said first line to terminate said inhibit signal.

4. The data processing system of claim 3 wherein said third bistable element comprises an RS flip-flop having an inverted set input terminal connected to said first signal line and an inverted reset input terminal connected to said second signal line; said allocation circuit further including a monostable multivibrator having a trigger input terminal for receiving signals resulting from an output signal of said third bistable element and an output terminal connected to said second signal line.

5. The data processing system of claim 4 wherein said allocation circuit further includes a fourth bistalbe element having one input terminal which is connected by logic means with the user system and with said first bistable element and a second input terminal connected to said second signal line so as to generate an output signal responsive to requests by the user system to the bus for accessing next selection.

6. The data processing system of claim 5 wherein said logic means comprises an AND gate having input terminals respectively connected to said user system and said first bistable element; said fourth bistable element comprising an RS flip-flop having an inverted set input terminal connected to said second signal line, an inverted reset input terminal connected to an output terminal of said AND gate and an output terminal connected to an OR gate which produces an output signal to indicate that the user system is selecting the bus; said allocation circuit further including a second NAND gate having an input terminal connected to said output terminal of said fourth bistable element and an output terminal connected to said trigger terminal of said monostable multivibrator.

7. The data processing system of claim 6 further including a third signal line of indicating that the bus is being requested by at least one of said user systems, said allocation circuit further comprising a fifth bistable element having input terminals respectively connected to said second bistable element and to said third signal line for generating a signal to inhibit the associated user system form selecting the bus being requested by another user system coincident with bus availability to said associated user system.

8. The data processing system of claim 7 wherein said fifth bistable element comprises an RS flip-flop having an inverted set input terminal connected to said third signal line, an inverted reset input terminal connected to an output terminal of said second bistable element and an output terminal connected to another input terminal of said AND gate, said output terminal of said AND gate being connected to said third signal line.

* * * * *